(12) United States Patent
Yi (10) Patent No.: US 10,631,290 B2
(45) Date of Patent: Apr. 21, 2020

(54) CORRECTION SIGNAL TRANSMISSION METHOD AND BASE STATION

(71) Applicant: HUAWEI TECHNOLOGIES CO., LTD., Shenzhen (CN)

(72) Inventor: Xiongshu Yi, Chengdu (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 329 days.

(21) Appl. No.: 15/079,654

(22) Filed: Mar. 24, 2016

(65) Prior Publication Data
US 2016/0205684 A1   Jul. 14, 2016

Related U.S. Application Data

(63) Continuation of application No. PCT/CN2014/082159, filed on Jul. 14, 2014.

(30) Foreign Application Priority Data

Sep. 25, 2013 (CN) .......................... 2013 1 0441861

(51) Int. Cl.
*H04W 72/04* (2009.01)
*H04W 72/00* (2009.01)

(52) U.S. Cl.
CPC ....... *H04W 72/0446* (2013.01); *H04W 72/00* (2013.01)

(58) Field of Classification Search
CPC ............... H04W 72/00; H04B 7/18532; H04B 7/18539; H04B 7/2606
See application file for complete search history.

(56) References Cited

U.S. PATENT DOCUMENTS

| 5,566,168 A * | 10/1996 | Dent ................. H04B 7/18539 370/323 |
| 6,175,560 B1 * | 1/2001 | Bhagalia ................ H04B 1/707 370/320 |

(Continued)

FOREIGN PATENT DOCUMENTS

| CN | 101064902 | 10/2007 |
| CN | 101232314 A | 7/2008 |

(Continued)

OTHER PUBLICATIONS

International Search Report dated Sep. 29, 2014, in corresponding International Application No. PCT/CN2014/082159.

(Continued)

*Primary Examiner* — Raj Jain
(74) *Attorney, Agent, or Firm* — Womble Bond Dickinson (US) LLP (57) ABSTRACT

Embodiments of the present invention disclose a correction signal transmission method, including: acquiring, by a base station of a first network, a transmit timeslot position that is in a guard period GP used for transmitting a correction signal, where the transmit timeslot position is a timeslot position that is determined based on a timeslot configuration of a second network and/or a signal transmitted by the second network, and interference suffered from a signal transmitted by the second network at the transmit timeslot position is less than a preset interference threshold; and the first network and the second network are comprised in hybrid networks; and transmitting, by the base station, a correction signal at the transmit timeslot position. Correspondingly, the embodiments of the present invention further disclose a base station. Interference to a correction signal in hybrid networks can be reduced in the embodiments of the present invention.

14 Claims, 4 Drawing Sheets

(56) References Cited

U.S. PATENT DOCUMENTS

| | | | |
|---|---|---|---|
| 2007/0054691 A1* | 3/2007 | Sankar | H04W 52/325 |
| | | | 455/522 |
| 2007/0173280 A1* | 7/2007 | Nakayauchi | H04W 52/12 |
| | | | 455/522 |
| 2009/0180435 A1 | 7/2009 | Sarkar | |
| 2010/0046680 A1* | 2/2010 | Okino | H04B 7/0857 |
| | | | 375/346 |
| 2010/0322227 A1 | 12/2010 | Luo | |
| 2011/0235601 A1 | 9/2011 | Yoo et al. | |
| 2012/0294288 A1* | 11/2012 | Chin | H04W 72/0446 |
| | | | 370/335 |
| 2013/0028346 A1 | 1/2013 | Hottinen | |
| 2014/0376449 A1* | 12/2014 | Takano | H04W 72/08 |
| | | | 370/315 |
| 2016/0205684 A1* | 7/2016 | Yi | H04W 72/0446 |
| | | | 370/336 |

FOREIGN PATENT DOCUMENTS

| | | |
|---|---|---|
| CN | 101304276 A | 11/2008 |
| CN | 102201879 A | 9/2011 |
| CN | 102244531 A | 11/2011 |
| JP | 2008-160618 | 7/2008 |

OTHER PUBLICATIONS

International Search Report dated Sep. 29, 2014 in corresponding International Patent Application No. PCT/CN2014/082159.
Extended European Search Report dated Aug. 25, 2016 in corresponding European Patent Application No. 14847528.8.

* cited by examiner

DL: Downlink timeslot  UL: Uplink timeslot

FIG. 4

DL: Downlink timeslot  UL: Uplink timeslot

FIG. 5

```
A base station of a first network receives indication    601
information sent by a network side device, where the
indication information indicates a transmit timeslot
position that is in a guard period GP used for
transmitting a correction signal
```

```
The base station transmits the correction signal at the    602
transmit timeslot position
```

CORRECTION SIGNAL TRANSMISSION METHOD AND BASE STATION

CROSS-REFERENCE TO RELATED APPLICATIONS

This application is a continuation of International Application No. PCT/CN2014/082159, filed on Jul. 14, 2014, which claims priority to Chinese Patent Application No. CN 201310441861.9, filed on Sep. 25, 2013, both of which are incorporated herein by reference in their entireties.

TECHNICAL FIELD

The present invention relates to the communications field, and in particular, to a correction signal transmission method and a base station.

BACKGROUND

With the development of service demands of users and network technologies, hybrid networking has become a trend, that is, at least two networks simultaneously provide coverage and simultaneously provide services to users. For example, hybrid coverage of a Time Division-Synchronous Code Division Multiple Access (TD-SCDMA) network and a Time Division-Long Term Evolution (TD-LTE) network, that is, a hybrid networking scenario of TD-SCDMA and TD-LTE, is already implemented at present, and because this scenario easily satisfies a demand of a user, this scenario is widely applied. Because both networks in the foregoing hybrid networks, for example, the TD-SCDMA network and the TD-LTE network, use a Time Division Duplex (TDD) system to perform data communication and an uplink frequency and a downlink frequency are the same in the TDD system, in a communication process, downlink channel information may be estimated by using uplink channel information; a premise of this estimation is that a channel correction of a remote radio unit (RRU) needs to be completed. In the TD-SCDMA network and the TD-LTE network, a correction signal is sent in a guard period (GP) to complete the channel correction of the RRU.

In an actual application, because carrier frequencies used in networks in hybrid networks are similar or the same, for example, the TD-SCDMA network and the TD-LTE network, in the hybrid networking scenario of TD-SCDMA and TD-LTE, a signal of the TD-SCDMA network may leak to a GP of the TD-LTE network, thereby causing interference to a correction signal in the GP; and a signal of the TD-LTE network may also leak to a GP of the TD-SCDMA network, which also causes interference to a correction signal in the GP. As can be seen, interference to a correction signal exists in hybrid networks at present.

SUMMARY

Embodiments of the present invention provide a correction signal transmission method and a base station, which can reduce interference to a correction signal in hybrid networks.

According to a first aspect, an embodiment of the present invention provides a correction signal transmission method, including:

acquiring, by a base station of a first network, a transmit timeslot position that is in a guard period GP used for transmitting a correction signal, wherein the transmit timeslot position is a timeslot position that is determined based on a timeslot configuration of a second network and/or a signal transmitted by the second network, and interference suffered from a signal transmitted by the second network at the transmit timeslot position is less than a preset interference threshold; and the first network and the second network are comprised in hybrid networks; and transmitting, by the base station, a correction signal at the transmit timeslot position.

In a first possible implementation manner of the first aspect, the acquiring, by a base station of a first network, a transmit timeslot position that is in a GP used for transmitting a correction signal includes:

calculating, by the base station of the first network, based on a timeslot configuration of the first network and the timeslot configuration of the second network, a transmit timeslot position that is included in the GP and at which signal strength of the second network is less than preset signal strength when a correction signal is being transmitted in the GP; or calculating, by the base station of the first network, based on the signal transmitted by the second network, a transmit timeslot position that is included in the GP used for transmitting a correction signal and at which signal strength of the second network is less than preset signal strength.

With reference to the first possible implementation manner of the first aspect, in a second possible implementation manner of the first aspect, the calculating, by the base station of the first network, based on a timeslot configuration of the first network and the timeslot configuration of the second network, a transmit timeslot position that is included in the GP and at which signal strength of the second network is less than preset signal strength when a correction signal is being transmitted in the GP includes:

calculating, by the base station of the first network, based on the timeslot configuration of the first network and the timeslot configuration of the second network, a transmit timeslot position that is in the GP used for transmitting a correction signal and that differs from a timeslot position, in the second network, for transmitting a signal.

With reference to the first possible implementation manner of the first aspect, in a third possible implementation manner of the first aspect, the calculating, by the base station of the first network, based on the signal transmitted by the second network, a transmit timeslot position that is included in the GP used for transmitting a correction signal and at which signal strength of the second network is less than preset signal strength includes:

calculating, by the base station of the first network, based on the signal transmitted by the second network, power that the signal transmitted by the second network generates on each time-domain sampling point of the GP used for transmitting a correction signal; and selecting, by the base station, from the GP, a timeslot position that has a preset length and includes continuous interference time-domain sampling points whose quantity is less than a preset threshold as the transmit timeslot position, where the interference time-domain sampling point refers to a time-domain sampling point whose power is less than a preset interference power threshold.

With reference to the first possible implementation manner of the first aspect, in a fourth possible implementation manner of the first aspect, the calculating, by the base station of the first network, based on the signal transmitted by the second network, a transmit timeslot position that is included in the GP used for transmitting a correction signal and at which signal strength of the second network is less than preset signal strength includes:

calculating, by the base station of the first network, based on the signal transmitted by the second network, power that the signal transmitted by the second network generates on each time-domain sampling point of the GP used for transmitting a correction signal; and selecting, by the base station, from the GP, a timeslot position that has a preset length and includes continuous interference time-domain sampling points whose quantity is less than a preset threshold as the transmit timeslot position, where the interference time-domain sampling point refers to a time-domain sampling point whose power is less than a preset interference power threshold.

With reference to the first aspect, in a fifth possible implementation manner of the first aspect, the acquiring, by a base station of a first network, a transmit timeslot position that is in a guard period GP used for transmitting a correction signal includes:

receiving, by the base station of the first network, indication information sent by a network side device, where the indication information indicates the transmit timeslot position that is in the guard period GP used for transmitting a correction signal, and the transmit timeslot position is a timeslot position that is determined by the network side device based on a timeslot configuration of the first network and the timeslot configuration of the second network, and at which the interference of the signal transmitted by the second network is less than the preset interference threshold.

According to a second aspect, an embodiment of the present invention provides a base station, where the base station is a base station of a first network, and the base station includes an acquiring unit and a transmission unit, where the acquiring unit is configured to acquire a transmit timeslot position that is in a guard period GP used for transmitting a correction signal, where the transmit timeslot position is a timeslot position that is determined based on a timeslot configuration of a second network or a signal transmitted by the second network, and interference suffered from a signal transmitted by the second network at the transmit timeslot position is less than a preset interference threshold; and the first network and the second network are comprised in hybrid networks; and the transmission unit is configured to transmit a correction signal at the transmit timeslot position.

In a first possible implementation manner of the second aspect, the acquiring unit is specifically configured to calculate, based on a timeslot configuration of the first network and the timeslot configuration of the second network, a transmit timeslot position that is included in the GP and at which signal strength of the second network is less than preset signal strength when a correction signal is being transmitted in the GP; or the acquiring unit is specifically configured to calculate, based on the signal transmitted by the second network, a transmit timeslot position that is included in the GP used for transmitting a correction signal and at which signal strength of the second network is less than preset signal strength.

With reference to the first possible implementation manner of the second aspect, in a second possible implementation manner of the second aspect, the acquiring unit is specifically configured to calculate, based on the timeslot configuration of the first network and the timeslot configuration of the second network, a transmit timeslot position that is in the GP used for transmitting a correction signal and that differs from a timeslot position, in the second network, for transmitting a signal.

With reference to the first possible implementation manner of the second aspect, in a third possible implementation manner of the second aspect, the acquiring unit is specifically configured to calculate, based on the signal transmitted by the second network, power that the signal transmitted by the second network generates on each time-domain sampling point of the GP used for transmitting a correction signal; and select, from the GP, a timeslot position that has a preset length and includes continuous interference time-domain sampling points whose quantity is less than a preset threshold as the transmit timeslot position, where the interference time-domain sampling point refers to a time-domain sampling point whose power is less than a preset interference power threshold.

With reference to the first possible implementation manner of the second aspect, in a fourth possible implementation manner of the second aspect, the acquiring unit is specifically configured to calculate, based on the signal transmitted by the second network, energy that the signal transmitted by the second network generates on each correction symbol of the GP used for transmitting a correction signal, where a length of the correction symbol is equal to a length of the correction signal; and select a correction symbol whose energy is the smallest among correction symbols included by the GP, and use the correction symbol as the transmit timeslot position.

With reference to the second aspect, in a fifth possible implementation manner of the second aspect, the acquiring unit is specifically configured to receive indication information sent by a network side device, where the indication information indicates the transmit timeslot position that is in the guard period GP used for transmitting a correction signal, and the transmit timeslot position is a timeslot position that is determined by the network side device based on a timeslot configuration of the first network and the timeslot configuration of the second network, and at which the interference of the signal transmitted by the second network is less than the preset interference threshold.

In the foregoing technical solutions, a base station of a first network acquires a transmit timeslot position that is in a guard period GP used for transmitting a correction signal, where the transmit timeslot position is a timeslot position that is determined based on a timeslot configuration of a second network and/or a signal transmitted by the second network, and interference suffered from a signal transmitted by the second network at the transmit timeslot position is less than a preset interference threshold; and the first network and the second network are comprised in hybrid networks; and the base station transmits a correction signal at the transmit timeslot position. In this way, it can be implemented that a timeslot position for sending a correction signal is less interfered by a signal transmitted by a second network, so that interference to a correction signal in hybrid networking can be reduced.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the embodiments of the present invention, hybrid networking in which a first network is located may be any hybrid networking in the communications field, for example, hybrid networking of TD-SCDMA and TD-LTE. The foregoing first network may be any network in the hybrid networking, and a second network is any other network except the first network in the hybrid networking, for example, if the first network is a TD-SCDMA network, the second network may be a TD-LTE network; or for another example, if the first network is a TD-LTE network, the second network may be a TD-SCDMA network. That is, a base station in the embodiments of the present invention may be a base station of the TD-SCDMA network, or may be a base station of the TD-LTE network. The embodiments of the present invention are described emphatically by using the hybrid networking of TD-SCDMA and TD-LTE as an example, but the embodiments of the present invention are not limited thereto.

The technical solutions provided in the embodiments of the present invention may be applied to various wireless communications networks, such as: a Global System for Mobile Communications (GSM for short) system, a Code Division Multiple Access (CDMA for short) system, a Wideband Code Division Multiple Access (WCDMA for short) system, a Universal Mobile Telecommunications (UMTS for short) system, a general packet radio service (GPRS for short) system, a Long Term Evolution (LTE for short) system, a Long Term Evolution Advanced (LTE-A for short) system, and a Worldwide Interoperability for Microwave Access (WiMAX for short) system. The terms "network" and "system" may be interchanged.

In the embodiments of the present invention, the base station (BS for short) may be a device for communicating with user equipment (UE for short) or with another communications site, for example, a repeater site, and the base station may provide communication coverage to a specific physical area. For example, the base station may be specifically a base transceiver station (BTS for short) in GSM or in CDMA, or a base station controller (BSC for short); may be a node B (Node B, NB for short) in UMTS or a radio network controller (RNC for short) in UMTS; may be an evolved NodeB (Evolutional Node B, ENB or eNodeB for short) in LTE; may be a base station of the TD-SCDMA network; or may be another network access device that provides an access service in a wireless communications network, which are not limited in the present invention.

In the embodiments of the present invention, the UE may be distributed in an entire wireless network, and each UE may be static or mobile. The UE may be referred to as a terminal, a mobile station, a subscriber unit, a station, or the like. The UE may be a cellular phone, a personal digital assistant (PDA for short), a wireless modem, a wireless communications device, a handheld device, a laptop computer, a cordless phone, a wireless local loop (WLL for short) station, or the like.

In addition, a correction signal is not limited in the embodiments of the present invention either, for example, the correction signal may be a low peak to average power ratio signal, or simply referred to as a low PAPR signal.

Figure 1:
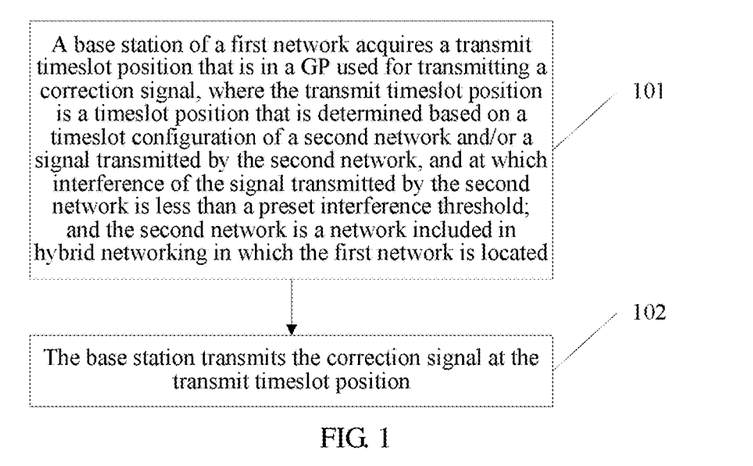
FIG. 1 is a schematic flowchart of a correction signal transmission method according to an embodiment of the present invention.

FIG. 1 is a schematic flowchart of a correction signal transmission method according to an embodiment of the present invention. As shown in FIG. 1, the method includes:

101: A base station of a first network acquires a transmit timeslot position that is in a GP used for transmitting a correction signal, where the transmit timeslot position is a timeslot position that is determined based on a timeslot configuration of a second network and/or a signal transmitted by the second network, and interference suffered from a signal transmitted by the second network at the transmit timeslot position is less than a preset interference threshold; and the first network and the second network are comprised in hybrid networks.

Optionally, the foregoing preset interference threshold may be set by a user, or may be predefined in a communications system, for example, the foregoing preset interference threshold may be 0. The timeslot position at which the interference of the signal transmitted by the second network is less than the preset interference threshold may specifically refer to a timeslot position at which interference, of the signal transmitted by the second network, to the correction signal transmitted by the first network is less than the preset interference threshold. In this embodiment, the interference of the signal transmitted by the second network may be obtained by using strength of the signal transmitted by the second network, or power or energy that is generated by the signal transmitted by the second network. Smaller signal strength, included in the foregoing transmit timeslot position, of the second network indicates less interference to the correction signal that is transmitted at the transmit timeslot position by the first network. For example, when the foregoing preset interference threshold is 0, that is, the foregoing transmit timeslot position does not include the signal transmitted by the second network, there is no interference to the correction signal sent at the transmit timeslot position.

Optionally, the acquiring, by a base station of a first network, a transmit timeslot position that is in a GP used for transmitting a correction signal may be specifically: acquiring, by the base station through calculation, the transmit timeslot position that is in the GP used for transmitting a correction signal; may be: receiving, by the base station, indication information sent by a network side device and used for indicating the transmit timeslot position that is in the GP used for transmitting a correction signal, so as to acquire the transmit timeslot position that is in the GP according to the indication information; or may be: directly acquiring, by the base station, the transmit timeslot position that is in the GP used for transmitting a correction signal.

Optionally, that the foregoing transmit timeslot position is determined based on the timeslot configuration of the second network and/or the signal transmitted by the second network may be specifically understood as: the foregoing transmit timeslot position is determined based on the timeslot configuration of the second network, the foregoing transmit timeslot position is determined based on the signal transmitted by the second network, or the foregoing transmit timeslot position is determined based on the timeslot configuration of the second network and the signal transmitted by the second network.

102: The base station transmits a correction signal at the transmit timeslot position.

Optionally, for the foregoing transmission, the correction signal may be specifically transmitted by using a ZC sequence.

In the foregoing technical solutions, a base station of a first network acquires a transmit timeslot position that is in a guard period GP used for transmitting a correction signal, where the transmit timeslot position is a timeslot position that is determined based on a timeslot configuration of a second network and/or a signal transmitted by the second network, and interference suffered from a signal transmitted by the second network at the transmit timeslot position is less than a preset interference threshold; and the first network and the second network are comprised in hybrid networks; and the base station transmits a correction signal at the transmit timeslot position. In this way, it can be implemented that a timeslot position for sending a correction signal is less interfered by a signal transmitted by a second network, so that interference to a correction signal in hybrid networking can be reduced.

Figure 2:
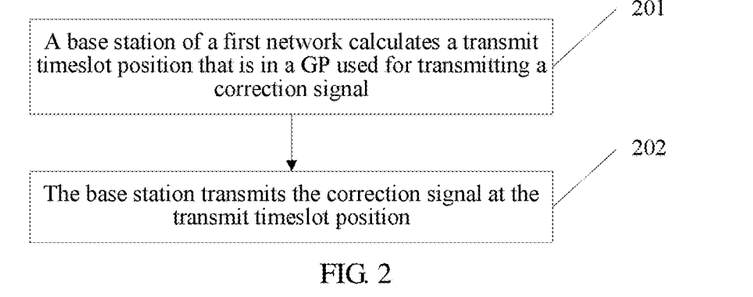
FIG. 2 is a schematic flowchart of another correction signal transmission method according to an embodiment of the present invention.

FIG. 2 is a schematic flowchart of another correction signal transmission method according to an embodiment of the present invention. As shown in FIG. 2, the method includes:

201: A base station of a first network calculates a transmit timeslot position that is in a GP used for transmitting a correction signal, where the transmit timeslot position is a timeslot position that is calculated based on a timeslot configuration of a second network and/or a signal transmitted by the second network, and interference suffered from a signal transmitted by the second network at the transmit timeslot position is less than a preset interference threshold; and the first network and the second network are comprised in hybrid networks.

Optionally, in step 201, the foregoing transmit timeslot position may be dynamically calculated, or the foregoing transmit timeslot position may be statically calculated. Dynamic calculation may refer to that when the correction signal needs to be transmitted, a transmit timeslot position in the GP at this time is calculated. In this way, it can be implemented that the foregoing transmit timeslot position is changed with the signal of the second network. Static calculation may refer to pre-calculating the transmit timeslot position, that is, the transmit timeslot position may be fixed.

Optionally, for the static calculation, step 201 may specifically include:
calculating, by the base station of the first network, based on a timeslot configuration of the first network and the timeslot configuration of the second network, a transmit timeslot position that is included in the GP and at which signal strength of the second network is less than preset signal strength when a correction signal is being transmitted in the GP.

Smaller signal strength, included in the transmit timeslot position, of the second network indicates that at the transmit timeslot position, transmission is less interfered by the signal transmitted by the second network. Specifically, the transmit timeslot position that is included in the GP and at which the signal strength of the second network is less than the preset signal strength may be pre-estimated when a correction signal is being transmitted in the GP. For example, a timeslot position that is in the GP and that differs from a timeslot position, in the second network, for transmitting a signal is calculated and is used as the foregoing transmit timeslot position. That is, step 201 may specifically include:
calculating, by the base station of the first network, based on the timeslot configuration of the first network and the timeslot configuration of the second network, a transmit timeslot position that is in the GP used for transmitting a correction signal and that differs from a timeslot position, in the second network, for transmitting a signal.

That is, the timeslot configuration of the first network and the timeslot configuration of the second network are acquired in advance, where the timeslot configuration of the first network may specifically include a timeslot configuration of the foregoing GP.

Optionally, the foregoing timeslot position, in the second network, for transmitting a signal may specifically include: a downlink timeslot for transmitting a downlink signal, an uplink timeslot for transmitting an uplink signal, a downlink pilot timeslot (Downlink Pilot Time Slot, DwPTS), a GP, an uplink pilot timeslot (Uplink Pilot Time Slot, UpPTS), or the like.

Figure 3:
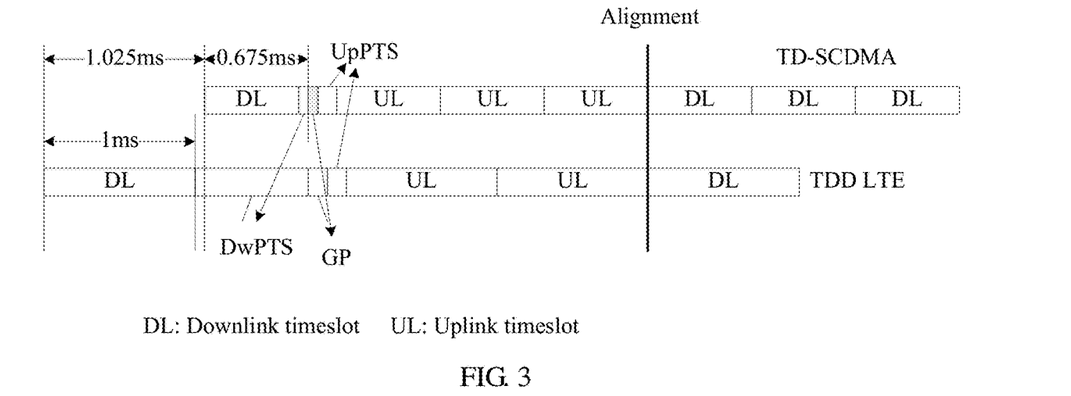
FIG. 3 to FIG. 5 are schematic diagrams of multiple optional carrier configurations according to embodiments of the present invention.

Calculation of the foregoing transmit timeslot position is described below by using a specific scenario:

For example, in a scenario shown in FIG. 3, an uplink timeslot (or an uplink subframe) and a downlink timeslot (or a downlink subframe) of TDD-LTE are both 1 millisecond (ms), a ratio between a DwPTS, a GP, and an UpPTS is 10:2:2, that is, DwPTS:GP:UpPTS is equal to 10:2:2, and the DwPTS, the GP, and the UpPTS are respectively 21952 Ts, 4384 Ts, and 4384 Ts, where Ts represents sampling duration, and 1 Ts is equal to 1/(30.72*10^6) second. An uplink timeslot and a downlink timeslot of TDD SCDMA are both 675 microseconds (us), where the DwPTS is 75 us, the GP is 75 us, and the UpPTS is 125 us.

It may be obtained according to the foregoing description that a starting position of a GP area of the TD-SCDMA is 1.025 ms+0.675 ms+0.075 ms=1.775 ms. A starting position of a GP area of the TDD-LTE is 1 ms+0.71458 ms=1.71458 ms. That is, the starting position of the GP area of the TDD-LTE precedes the starting position of the GP area of the TD-SCDMA by 60.4 us, that is, a same timeslot position of 60.4 us exists in the DwPTS of the TD-SCDMA and the GP of the TDD-LTE. In this way, a downlink signal in the DwPTS of the TD-SCDMA may interfere with the GP of the TDD-LTE within 60.4 us, that is, a correction signal transmitted in 0 us to 60.4 us in the GP of the TDD-LTE may be interfered. For this scenario, a timeslot position of (60.4 us+X us) in the GP may be selected as the foregoing transmit timeslot position, where X represents a deviation, and for a value of X, reference may be made to a propagation delay, to the first network, of a downlink signal transmitted by the second network, where the downlink signal may include a normal public network signal and a service signal, and may also include a transmitted correction signal.

Figure 4:
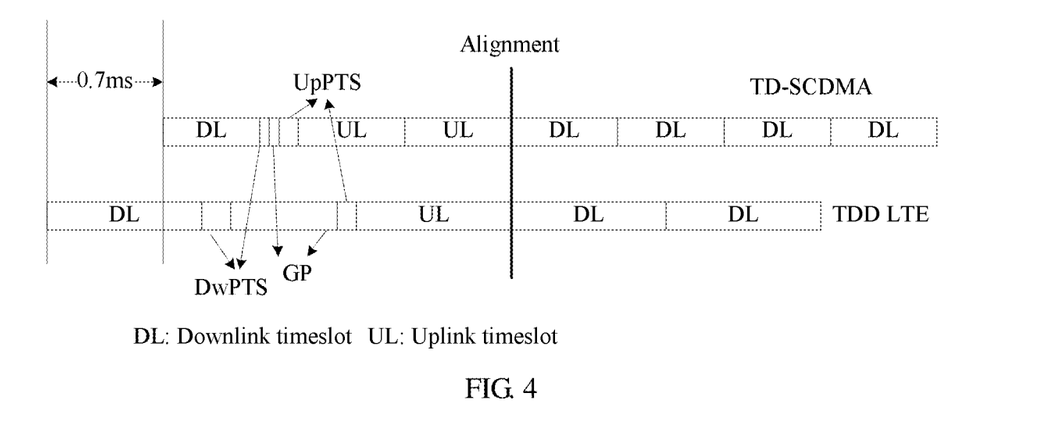

For example, in a scenario shown in FIG. 4, an uplink timeslot (or an uplink subframe) and a downlink timeslot (or a downlink subframe) of TDD-LTE are both 1 millisecond (ms), a ratio between a DwPTS, a GP, and an UpPTS is 3:9:2, that is, DwPTS:GP:UpPTS is equal to 3:9:2, and the DwPTS, the GP, and the UpPTS are respectively 6592 Ts, 19744 Ts and 4384 Ts. An uplink timeslot and a downlink timeslot of TDD SCDMA are both 675 microseconds (us), where the DwPTS is 75 us, the GP is 75 us, and the UpPTS is 125 us.

It may be obtained according to the foregoing description that a starting position of a GP area of the TD-SCDMA is 0.7 ms+0.675 ms+0.075 ms=1.45 ms. A starting position of a GP area of the TDD-LTE is 1 ms+0.21458 ms=1.21458 ms. That is, the starting position of the GP area of the TDD-LTE precedes the starting position of the GP area of the TD-SCDMA by 234.4 us, that is, a same timeslot position of 75 us exists in the DwPTS of the TD-SCDMA and the GP of the TDD-LTE, and a same timeslot position of 159.4 us exists in the downlink timeslot of the TD-SCDMA and the GP of the TDD-LTE. In this way, a downlink signal in the DwPTS of the TD-SCDMA may interfere with the GP of the TDD-LTE within 234.4 us, that is, a correction signal transmitted in 0 us to 234.4 us in the GP of the TDD-LTE may be interfered. For this scenario, a timeslot position of (234.4 us+X us) in the GP may be selected as the transmit timeslot position.

Figure 5:
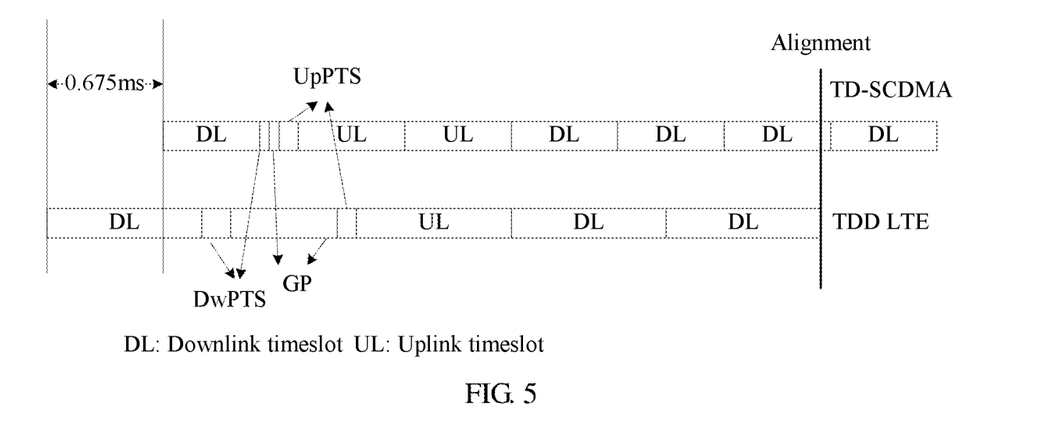

For example, in a scenario shown in FIG. 5, an uplink timeslot (or an uplink subframe) and a downlink timeslot (or a downlink subframe) of TDD-LTE are both 1 millisecond (ms), a ratio between a DwPTS, a GP, and an UpPTS is 3:9:2, that is, DwPTS:GP:UpPTS is equal to 3:9:2, and the DwPTS, the GP, and the UpPTS are respectively 6592 Ts, 19744 Ts and 4384 Ts. An uplink timeslot and a downlink timeslot of TDD SCDMA are both 675 us, where the DwPTS is 75 us, the GP is 75 us, and the UpPTS is 125 us.

It may be obtained according to the foregoing description that a starting position of a GP area of the TD-SCDMA is 0.675 ms+0.675 ms+0.075 ms=1.425 ms. A starting position of a GP area of the TDD-LTE is 1 ms+0.21458 ms=1.21458 ms. That is, the starting position of the GP area of the TDD-LTE precedes the starting position of the GP area of the TD-SCDMA by 210.4 us, that is, a same timeslot position of 75 us exists in the DwPTS of the TD-SCDMA and the GP of the TDD-LTE, and a same timeslot position of 135.4 us exists in the downlink timeslot of the TD-SCDMA and the GP of the TDD-LTE. In this way, a downlink signal in the DwPTS of the TD-SCDMA may interfere with the GP of the TDD-LTE within 210.4 us, that is, a correction signal transmitted in 0 us to 210.4 us in the GP of the TDD-LTE may be interfered. For this scenario, a timeslot position of (210.4 us+X us) in the GP may be selected as the transmit timeslot position.

It may be further obtained according to the foregoing analysis that in the foregoing three scenarios, a downlink signal of the TDD-LTE has no impact on a correction signal in a GP of the TD-SCDMA. When transmit channel correction is performed on the TDD-LTE, because a receive channel of the LTE is closed when an interference signal leaked by another system (for example, the TD-SCDMA) reaches the receive channel of the LTE, the interference signal cannot enter the receive channel and accordingly no impact is caused. However, the correction signal in the GP of the TD-SCDMA may still be interfered; and in this sense, for two networks, optimal correction signal transmission positions of the two networks may be jointly considered according to timeslot configurations and correction signal transmission positions. The transmit timeslot position (including a starting position of a transmit channel correction signal and a starting position of a receive channel correction signal) of the TDD-LTE may be shown in the following table:

| Scenario | Starting position of a transmit channel correction signal | Starting position of a receive channel correction signal |
| --- | --- | --- |
| 1 | Any position in a GP | 60.4 us + X us |
| 2 | Any position in a GP | 235.4 us + X us |
| 3 | Any position in a GP | 210.4 us + X us |

Optionally, the correction signal may specifically include a transmit channel correction signal and a receive channel correction signal, that is, the transmit timeslot position may specifically refer to a starting position of the transmit channel correction signal or a starting position of the receive channel correction signal. The starting position of the transmit channel correction signal of the TDD-LTE network may be any position in the GP. In this way, in this embodiment, the transmit timeslot position of the TDD-LTE network may specifically refer to a transmission position of a receive channel correction signal, that is, for the TDD-LTE network, the correction signal may specifically refer to the receive channel correction signal.

In addition, it may be obtained from the foregoing examples that, a timeslot position with a same timeslot exists in the GP of the TDD-LTE network and the GP of the TD-SCDMA network; in this way, a correction signal transmitted in the GP of the TDD-LTE network may also interfere with a correction signal transmitted in the GP of the TD-SCDMA network; therefore, in this embodiment of the present invention, transmit timeslot positions of multiple networks included in hybrid networking may be also calculated separately, to reduce interference between correction signals.

Optionally, for the dynamic calculation, step 201 may specifically include:

calculating, by the base station of the first network, based on the signal transmitted by the second network, a transmit timeslot position that is included in the GP used for transmitting a correction signal and at which signal strength of the second network is less than preset signal strength.

That is, when the correction signal needs to be transmitted, a transmit timeslot position that is included in the GP at this time and at which the signal strength of the second network is less than the preset signal strength may be calculated. Specifically, the transmit timeslot position that is included in the GP and at which the signal strength of the second network is less than the preset signal strength may be obtained by calculating power of each time-domain sampling point of the GP, because when a time-domain sampling point in the GP includes the signal of the second network, power is generated on this time-domain sampling point, and the power is proportional to the signal strength of the second network. Specifically, the transmit timeslot position that is included in the GP and at which the signal strength of the second network is less than the preset signal strength may be obtained by calculating energy of each correction symbol of the GP, because when a time-domain sampling point in the GP includes the signal of the second network, energy is generated on this correction symbol, and the energy is proportional to the signal strength of the second network. The correction symbol may be specifically a time length that a single correction signal lasts, that is, the correction symbol may be understood as a timeslot position whose length is the same as a length of the correction signal. For example: if the GP is 100 us and the length of the correction signal is 10 us, the GP may include a maximum of 10 correction symbols.

Optionally, step 201 may include:

calculating, by the base station of the first network, based on the signal transmitted by the second network, power that the signal transmitted by the second network generates on each time-domain sampling point of the GP used for transmitting a correction signal; and selecting, by the base station, from the GP, a timeslot position that has a preset length and includes continuous interference time-domain sampling points whose quantity is less than a preset threshold as the transmit timeslot position, where the interference time-domain sampling point refers to a time-domain sampling point whose power is less than a preset interference power threshold.

Optionally, the time-domain sampling point may be set in advance, for example, setting 30 or 50 time-domain sampling points in the GP, and then power of each time-domain sampling point is calculated. Because in an actual application, a signal of the second network that leaks to the GP of the first network usually interferes with a timeslot, this timeslot may include one or more time-domain sampling points, so that this timeslot can be obtained through the foregoing power calculation. Correspondingly, the timeslot position that has the preset length and includes the continuous interference time-domain sampling points whose quantity is less than the preset threshold may be selected as the transmit timeslot position. The preset length may be specifically equal to or greater than a length of the correction signal.

The selecting, by the base station, from the GP, a timeslot position that has a preset length and includes continuous interference time-domain sampling points whose quantity is less than a preset threshold as the transmit timeslot position may further specifically include:

determining, by the base station, a time-domain sampling point that is included in the GP and whose power is less than the interference power threshold as a time-domain sampling point having no interference, and marking the time-domain sampling point having no interference with "1"; and determining a time-domain sampling point that is included in the GP and whose power is greater than or equal to the interference power threshold as a time-domain sampling point having interference, and marking the time-domain sampling point having interference with "0"; and selecting, by the base station, from the GP, a timeslot position that has the preset length and includes continuous time-domain sampling points of "1" whose quantity is less than the preset threshold as the transmit timeslot position.

Optionally, after the calculating power of each time-domain sampling point, specific processing may be further performed on the power of each time-domain sampling point, for example, Alpha (alpha) filtering.

Optionally, the foregoing power calculation of the time-domain sampling point may be specifically performed by using the following formula:

$$p(n)=|r(n)|^2, 0 \leq n \leq N-1, \text{ where}$$

p(n) represents the power of the time-domain sampling point, n represents a number of the time-domain sampling point, r( ) represents a received signal of the time-domain sampling point, and N represents a total quantity of time-domain sampling points in the GP.

It can be implemented according to the foregoing description that the power of the time-domain sampling point is calculated, and then the foregoing transmit timeslot position is selected according to the power of each time-domain sampling point.

Optionally, step 201 may include:

calculating, by the base station of the first network, based on the signal transmitted by the second network, energy that the signal transmitted by the second network generates on each correction symbol of the GP used for transmitting a correction signal, where a length of the correction symbol is equal to a length of the correction signal; and selecting, by the base station, a correction symbol whose energy is the smallest among correction symbols included by the GP, and using the correction symbol as the transmit timeslot position.

For example, if a length of the GP is 100 us and a length of the correction signal is 10 us, there are 10 possible correction transmission positions. A method for obtaining interference power by means of segmentation may be used, for example:

$$p(k) = \frac{1}{L} \sum_{n=(k-1)*L+1}^{k*L} |r(n)|^2, N = K \cdot L, 1 \leq L \leq N,$$

where k represents a segment label, whose value is 0≤k<10; L represents a quantity of time-domain sampling points in each segment, where 1≤L≤N; and N represents a total quantity of sampling points in the GP.

Optionally, because the correction symbol may be specifically a timeslot position whose length is the same as a length of the correction signal, the using the correction symbol as the transmit timeslot position may be specifically: using a timeslot position corresponding to the correction symbol as the transmit timeslot position. The correction symbol may be set in advance. Because in an actual application, a signal of the second network that leaks to the GP of the first network usually interferes with at least one correction symbol, energy is generated on the at least one correction symbol, so that the at least one correction symbol can be obtained through the foregoing energy calculation. Correspondingly, the correction symbol whose energy is the smallest may be selected, and the correction symbol is used as the transmit timeslot position.

Optionally, the selecting, by the base station, a correction symbol whose energy is the smallest among correction symbols included by the GP, and using the correction symbol as the transmit timeslot position may specifically include:

selecting, by the base station, the correction symbol whose energy is the smallest among the correction symbols included by the GP, calculating interference power of each subcarrier in the correction symbol, selecting at least one subcarrier, whose interference power is less than a specific threshold, in subcarriers included in the correction symbol as a subcarrier that is used for transmitting a correction signal and is in the transmit timeslot position.

In this way, it can be implemented that at least one subcarrier, whose interference power is less than the specific threshold, in a correction symbol whose energy is small is selected as the subcarrier that is used for transmitting a correction signal and that is in the transmit timeslot position. Therefore, interference to the correction signal can be further reduced. Certainly, in this embodiment, the correction signal may also be sent on all subcarriers of the correction symbol whose energy is small. In the foregoing manner, a receive end may further perform noise reduction processing on channel information (for example, a channel estimation value or a phase) according to the at least one subcarrier used for transmitting a correction signal.

Optionally, the foregoing energy calculation of the correction symbol may be specifically performed in the following manner:

The base station performs a fast Fourier transform (Fast Fourier Transform, FFT) on the correction symbol in the GP, where an FFT size in an uplink service or a downlink service may be used for an FFT size (size). That is, a time domain signal used by the correction symbol is transformed to a frequency domain signal by means of FFT.

The base station calculates energy of the correction symbol after the correction symbol is transformed by means of FFT.

It can be implemented according to the foregoing description that power of each segment of correction symbol is calculated, and then the foregoing transmit timeslot position is selected according to power of each correction symbol.

The base station of the first network calculates, based on the timeslot configuration of the first network and the timeslot configuration of the second network, multiple transmit timeslot positions that are included in the GP and at which the signal strength of the second network is less than first preset signal-strength when a correction signal is being transmitted in the GP; or the base station of the first network calculates, based on the signal transmitted by the second network, a transmit timeslot position that is included in multiple transmit timeslot positions and at which the signal strength of the second network is less than second preset signal-strength.

The second preset signal-strength is less than the first preset signal-strength; in this way, it can be implemented that the transmit timeslot position is obtained in multiple times of different calculation manners.

202: The base station transmits a correction signal at the transmit timeslot position.

In the foregoing technical solution, multiple optional implementation manners are implemented based on the foregoing embodiment, and interference to a correction signal in hybrid networking can be reduced in all of the implementation manners.

Figure 6:
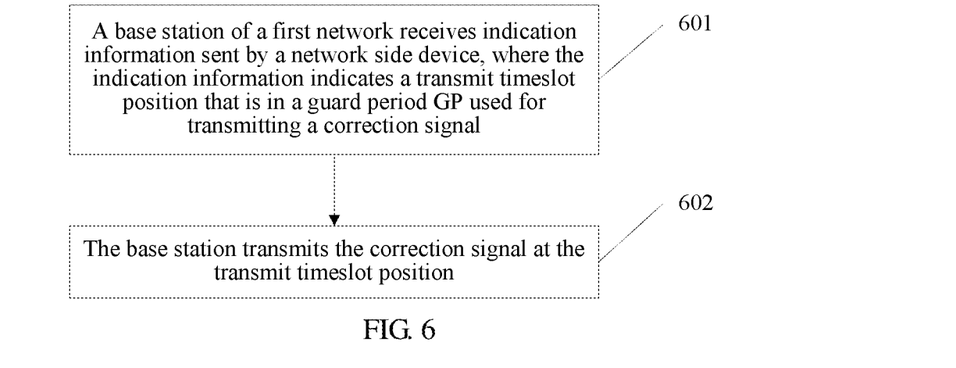
FIG. 6 is a schematic flowchart of another correction signal transmission method according to an embodiment of the present invention.

FIG. 6 is a schematic flowchart of another correction signal transmission method according to an embodiment of the present invention. As shown in FIG. 6, the method includes:

601: A base station of a first network receives indication information sent by a network side device, where the indication information indicates a transmit timeslot position that is in a guard period GP used for transmitting a correction signal, and the transmit timeslot position is a timeslot position that is determined by the network side device based on a timeslot configuration of the first network and a timeslot configuration of a second network, and at which interference of a signal transmitted by the second network is less than a preset interference threshold.

Optionally, the network side device may be specifically an operation, administration and maintenance (Operation Administration and Maintenance, OAM) unit. For calculating, by the OAM unit, the foregoing transmit timeslot position, reference may be specifically made to the implementation manners shown in FIG. 3 to FIG. 5. What the OAM unit sends to the base station may be specifically transmit timeslot positions in multiple scenarios (for example, the table in the second embodiment), and then the base station selects, according to a current timeslot configuration scenario, a transmit timeslot position used for sending a current correction signal.

602: The base station transmits a correction signal at the transmit timeslot position.

In the foregoing technical solution, it can be implemented that, the network side device calculates the transmit timeslot position, and then the base station receives the foregoing indication information, so that interference to a correction signal in hybrid networking is reduced.

A specific application scenario is described below as an example.

Figure 7:
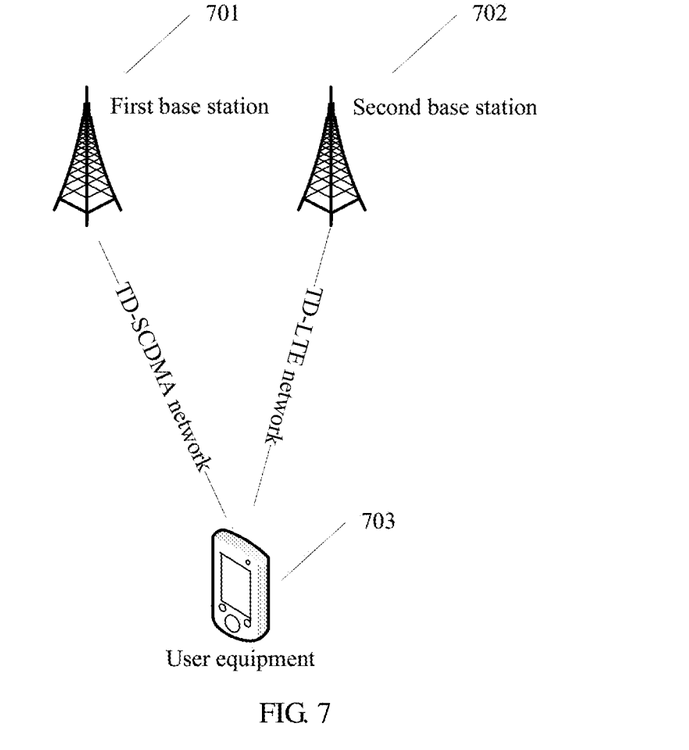
FIG. 7 is a schematic diagram of a scenario according to an embodiment of the present invention.

As shown in FIG. 7, a first base station 701 of a TD-SCDMA network, a second base station 702 of a TD-LTE network, and user equipment 703 are included. When the first base station 701 and the second base station 702 perform data communication with the user equipment 703 simultaneously or very closely in time, for a specific carrier configuration of communication data, reference may be made to configurations shown in FIG. 3 to FIG. 5. A carrier configuration shown in FIG. 3 is described below as an example. A carrier of TD-SCDMA lags behind a carrier of TD-LTE by 1.025 ms; in this way, when the carrier of the TD-LTE is switched to a GP, the carrier of the TD-SCDMA is still in a DwPTS, and a same timeslot position of 60.4 us exists in the GP of the TD-LTE and the DwPTS of the TD-SCDMA. That is, a downlink signal is still transmitted in the DwPTS of the TD-SCDMA within this 60.4 us, but a receive channel of a base station of the TD-LTE is open in the GP. If a correction signal is transmitted within 0 us to 60.4 us of the GP, the downlink signal transmitted in the DwPTS of the TD-SCDMA within this 60.4 us is very likely to leak to the receive channel of the base station of the TD-LTE, thereby causing interference to the correction signal in the GP. In this way, in this embodiment of the present invention, 60.4 us–X us in the GP may also be selected as the foregoing transmit timeslot position according to the multiple manners described above, that is, the correction signal is transmitted within 60.4 us–X us in the GP.

The following are apparatus embodiments of the present invention. The apparatus embodiments of the present invention are used to perform methods implemented in the first method embodiment and the second method embodiment of the present invention. For ease of description, only a part related to this embodiment of the present invention is shown, and for undisclosed technical details, refer to the first embodiment and the second embodiment of the present invention.

Figure 8:
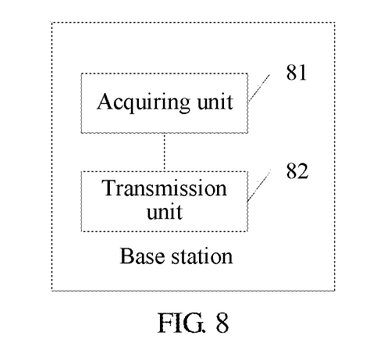
FIG. 8 is a schematic structural diagram of a base station according to an embodiment of the present invention.

FIG. 8 is a schematic structural diagram of a base station according to an embodiment of the present invention. The base station is a base station of a first network, and as shown in FIG. 8, the base station includes an acquiring unit 81 and a transmission unit 82.

The acquiring unit 81 is configured to acquire a transmit timeslot position that is in a guard period GP used for transmitting a correction signal, where the transmit timeslot position is a timeslot position that is determined based on a timeslot configuration of a second network or a signal transmitted by the second network, and interference suffered from a signal transmitted by the second network at the transmit timeslot position is less than a preset interference threshold; and the first network and the second network are comprised in hybrid networks.

Optionally, the foregoing preset interference threshold may be set by a user, or may be predefined in a communications system, for example, the foregoing preset interference threshold may be 0. The timeslot position at which the interference of the signal transmitted by the second network is less than the preset interference threshold may specifically refer to a timeslot position at which interference, of the signal transmitted by the second network, to the correction signal transmitted by the first network is less than the preset interference threshold. In this embodiment, the interference of the signal transmitted by the second network may be obtained by using strength of the signal transmitted by the second network, or power or energy that is generated by the signal transmitted by the second network. Smaller signal strength, included in the foregoing transmit timeslot position, of the second network indicates less interference to the correction signal that is transmitted at the transmit timeslot position by the first network. For example, when the foregoing preset interference threshold is 0, that is, the foregoing transmit timeslot position does not include the signal transmitted by the second network, there is no interference to the correction signal sent at the transmit timeslot position.

The transmission unit 82 is configured to transmit a correction signal at the transmit timeslot position.

Optionally, for the foregoing transmission, the correction signal may be specifically transmitted by using a ZC sequence.

In the foregoing technical solution, a transmit timeslot position that is in a guard period GP used for transmitting a correction signal is acquired, where the transmit timeslot position is a timeslot position that is determined based on a timeslot configuration of a second network or a signal transmitted by the second network, and interference suffered from a signal transmitted by the second network at the transmit timeslot position is less than a preset interference threshold; and the first network and the second network are comprised in hybrid networks; and the correction signal is transmitted at the transmit timeslot position. In this way, it can be implemented that a timeslot position for sending a correction signal is less interfered by a signal transmitted by a second network, so that interference to a correction signal in hybrid networking can be reduced.

Figure 9:
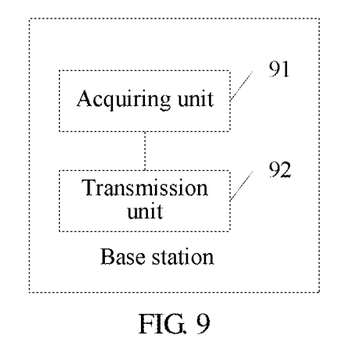
FIG. 9 is a schematic structural diagram of another base station according to an embodiment of the present invention.

FIG. 9 is a schematic structural diagram of another base station according to an embodiment of the present invention. The base station is a base station of a first network, and as shown in FIG. 9, the base station includes an acquiring unit 91 and a transmission unit 92.

The acquiring unit 91 is configured to calculate a transmit timeslot position that is in a GP used for transmitting a correction signal, where the transmit timeslot position is a timeslot position that is calculated based on a timeslot configuration of a second network and/or a signal transmitted by the second network, and interference suffered from a signal transmitted by the second network at the transmit timeslot position is less than a preset interference threshold; and the first network and the second network are comprised in hybrid networks.

Optionally, the acquiring unit 91 may dynamically calculate the foregoing transmit timeslot position, or may statically calculate the foregoing transmit timeslot position. Dynamic calculation may refer to that when the correction signal needs to be transmitted, a transmit timeslot position in the GP at this time is calculated. In this way, it can be implemented that the foregoing transmit timeslot position is changed with the signal of the second network. Static calculation may refer to pre-calculating the transmit timeslot position, that is, the transmit timeslot position may be fixed.

Optionally, for the static calculation, the acquiring unit 91 may be specifically configured to calculate, based on a timeslot configuration of the first network and the timeslot configuration of the second network, a transmit timeslot position that is included in the GP and at which signal strength of the second network is less than preset signal strength when a correction signal is being transmitted in the GP.

Specifically, the transmit timeslot position that is included in the GP and at which the signal strength of the second network is less than the preset signal strength may be pre-estimated when a correction signal is being transmitted in the GP. For example, a timeslot position that is in the GP and that differs from a timeslot position, in the second network, for transmitting a signal is calculated and is used as the foregoing transmit timeslot position. That is, the acquiring unit 91 may be specifically configured to calculate, based on the timeslot configuration of the first network and the timeslot configuration of the second network, a transmit timeslot position that is in the GP used for transmitting a correction signal and that differs from a timeslot position, in the second network, for transmitting a signal.

That is, the timeslot configuration of the first network and the timeslot configuration of the second network are acquired in advance, where the timeslot configuration of the first network may specifically include a timeslot configuration of the foregoing GP.

Optionally, the timeslot position, in the second network, for transmitting a signal may specifically include: a downlink timeslot for transmitting a downlink signal, an uplink timeslot for transmitting an uplink signal, a DwPTS, an UpPTS, or the like.

Optionally, for the dynamic calculation, the acquiring unit 91 may be specifically configured to calculate, based on the signal transmitted by the second network, a transmit timeslot position that is included in the GP used for transmitting a correction signal and at which signal strength of the second network is less than preset signal strength.

That is, when the correction signal needs to be transmitted, a transmit timeslot position that is included in the GP at this time and at which the signal strength of the second network is less than the preset signal strength may be calculated. Specifically, the transmit timeslot position that is included in the GP and at which the signal strength of the second network is less than the preset signal strength may be obtained by calculating power of each time-domain sampling point of the GP, because when a time-domain sampling point in the GP includes the signal of the second network, power is generated on this time-domain sampling point, and the power is proportional to the signal strength of the second network. Specifically, the transmit timeslot position that is included in the GP and at which the signal strength of the second network is less than the preset signal strength may be obtained by calculating energy of each correction symbol of the GP, because when a time-domain sampling point in the GP includes the signal of the second network, energy is generated on this correction symbol, and the energy is proportional to the signal strength of the second network. The correction symbol may be specifically a time length that a single correction signal lasts, that is, the correction symbol may be understood as a timeslot position whose length is the same as a length of the correction signal. For example: if the GP is 100 us and the length of the correction signal is 10 us, the GP includes a maximum of 10 correction symbols.

Optionally, the acquiring unit 91 may be specifically configured to calculate, based on the signal transmitted by the second network, power that the signal transmitted by the second network generates on each time-domain sampling point of the GP used for transmitting a correction signal; and select, from the GP, a timeslot position that has a preset length and includes continuous interference time-domain sampling points whose quantity is less than a preset threshold as the transmit timeslot position, where the interference time-domain sampling point refers to a time-domain sampling point whose power is less than a preset interference power threshold.

Optionally, the time-domain sampling point may be set in advance, for example, setting 30 or 50 time-domain sampling points in the GP, and then power of each time-domain sampling point is calculated. Because in an actual application, a signal of the second network that leaks to the GP of the first network usually interferes with a timeslot, this timeslot may include one or more time-domain sampling points, so that this timeslot can be obtained through the foregoing power calculation. Correspondingly, the timeslot position that has the preset length and includes the continuous interference time-domain sampling points whose quantity is less than the preset threshold may be selected as the transmit timeslot position. The preset length may be specifically equal to or greater than a length of the correction signal.

The selecting, by the acquiring unit 91, from the GP, a timeslot position that has a preset length and includes continuous interference time-domain sampling points whose quantity is less than a preset threshold as the transmit timeslot position may further specifically include:

determining, by the acquiring unit 91, a time-domain sampling point that is included in the GP and whose power is less than the interference power threshold as a time-domain sampling point having no interference, and marking the time-domain sampling point having no interference with "1"; and determining a time-domain sampling point that is included in the GP and whose power is greater than or equal to the interference power threshold as a time-domain sampling point having interference, and marking the time-domain sampling point having interference with "0"; and selecting, by the acquiring unit 91, from the GP, a timeslot position that has the preset length and includes continuous time-domain sampling points of "1" whose quantity is less than the preset threshold as the transmit timeslot position.

Optionally, after the calculating power of each time-domain sampling point, specific processing may be further performed on the power of each time-domain sampling point, for example, Alpha (alpha) filtering.

Optionally, the acquiring unit 91 may be specifically configured to calculate, based on the signal transmitted by the second network, energy that the signal transmitted by the second network generates on each correction symbol of the GP used for transmitting a correction signal, where a length of the correction symbol is equal to a length of the correction signal; and select a correction symbol whose energy is the smallest among correction symbols included by the GP, and use the correction symbol as the transmit timeslot position.

Optionally, because the correction symbol may be specifically a timeslot position whose length is the same as a length of the correction signal, the using the correction symbol as the transmit timeslot position may be specifically: using a timeslot position corresponding to the correction symbol as the transmit timeslot position. The correction symbol may be set in advance. Because in an actual application, a signal of the second network that leaks to the GP of the first network usually interferes with at least one correction symbol, energy is generated on the at least one correction symbol, so that the at least one correction symbol can be obtained through the foregoing energy calculation. Correspondingly, the correction symbol whose energy is the smallest may be selected, and the correction symbol is used as the transmit timeslot position.

Optionally, the selecting, by the acquiring unit 91, a correction symbol whose energy is the smallest among correction symbols included by the GP, and using the correction symbol as the transmit timeslot position may specifically include:

selecting, by the acquiring unit 91, the correction symbol whose energy is the smallest among the correction symbols included by the GP, calculating interference power of each subcarrier in the correction symbol, selecting at least one subcarrier, whose interference power is less than a specific threshold, in subcarriers included in the correction symbol as a subcarrier that is used for transmitting a correction signal and is in the transmit timeslot position.

In this way, it can be implemented that at least one subcarrier, whose interference power is less than the specific threshold, in a correction symbol whose energy is small is selected as the subcarrier that is used for transmitting a correction signal and that is in the transmit timeslot position. Therefore, interference to the correction signal can be further reduced. Certainly, in this embodiment, the correction signal may also be sent on all subcarriers of the correction symbol whose energy is small. In the foregoing manner, a receive end may further perform noise reduction processing on channel information (for example, a channel estimation value or a phase) according to the at least one subcarrier used for transmitting a correction signal.

Optionally, the foregoing energy calculation of the correction symbol may be specifically performed in the following manner:

The acquiring unit 91 performs an FFT transform on the correction symbol in the GP, where an FFT size in an uplink service or a downlink service may be used for an FFT size (size). That is, a time domain signal used by the correction symbol is transformed to a frequency domain signal by means of FFT.

The acquiring unit 91 calculates energy of the correction symbol after the correction symbol is transformed by means of FFT.

It can be implemented according to the foregoing description that the power of the time-domain sampling point is calculated, and then the foregoing transmit timeslot position is selected according to the power of each time-domain sampling point.

The transmission unit 92 is configured to transmit a correction signal at the transmit timeslot position.

In another embodiment, the acquiring unit 91 may be further specifically configured to receive indication information sent by a network side device, where the indication information indicates the transmit timeslot position that is in the guard period GP used for transmitting a correction signal, and the transmit timeslot position is a timeslot position that is determined by the network side device based on the timeslot configuration of the first network and the timeslot configuration of the second network, and at which the interference of the signal transmitted by the second network is less than the preset interference threshold.

Optionally, the network side device may be specifically an OAM unit. For calculating, by the OAM unit, the foregoing transmit timeslot position, reference may be specifically made to the implementation manners shown in FIG. 3 to FIG. 5. What the OAM unit sends to the base station may be specifically transmit timeslot positions in multiple scenarios (for example, the table in the second embodiment), and then the base station selects, according to a current timeslot configuration scenario, a transmit timeslot position used for sending a current correction signal.

In this embodiment, it can be implemented that, the network side device calculates the foregoing transmit timeslot position, and then the base station receives the indication information, so that interference to a correction signal in hybrid networking is reduced.

In the foregoing technical solution, multiple optional implementation manners are implemented based on the foregoing embodiment, and interference to a correction signal in hybrid networking can be reduced in all of the implementation manners.

Figure 10:
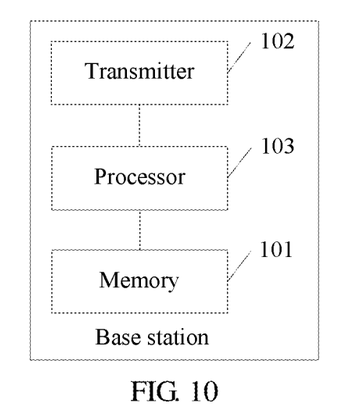
FIG. 10 is a schematic structural diagram of another base station according to an embodiment of the present invention.

FIG. 10 is a schematic structural diagram of another base station according to an embodiment of the present invention. The base station is a base station of a first network, and as shown in FIG. 10, the base station includes a memory 101, a transmitter 102, and a processor 103 connected to both the memory 101 and the transmitter 102. The memory 101 is configured to store a group of program code, and the processor 103 is configured to invoke the code stored in the memory 101 to perform the following operations:

acquiring a transmit timeslot position that is in a guard period GP used for transmitting a correction signal, where the transmit timeslot position is a timeslot position that is determined based on a timeslot configuration of a second network and/or a signal transmitted by the second network, and interference suffered from a signal transmitted by the second network at the transmit timeslot position is less than a preset interference threshold; and the first network and the second network are comprised in hybrid networks; and transmitting a correction signal at the transmit timeslot position by using the transmitter 102.

Optionally, the preset interference threshold may be set by a user, or may be predefined in a communications system, for example, the preset interference threshold may be 0. The timeslot position at which the interference of the signal transmitted by the second network is less than the preset interference threshold may specifically refer to a timeslot position at which interference, of the signal transmitted by the second network, to the correction signal transmitted by the first network is less than the preset interference threshold. In this embodiment, the interference of the signal transmitted by the second network may be obtained by using strength of the signal transmitted by the second network, or power or energy that is generated by the signal transmitted by the second network. Smaller signal strength, included in the foregoing transmit timeslot position, of the second network indicates less interference to the correction signal that is transmitted at the transmit timeslot position by the first network. For example, when the foregoing preset interference threshold is 0, that is, the foregoing transmit timeslot position does not include the signal transmitted by the second network, there is no interference to the correction signal sent at the transmit timeslot position.

In another embodiment, the processor 103 may be further configured to perform the following operations:

calculating a transmit timeslot position that is in a GP used for transmitting a correction signal, where the transmit timeslot position is a timeslot position that is calculated based on a timeslot configuration of a second network and/or a signal transmitted by the second network, and interference suffered from a signal transmitted by the second network at the transmit timeslot position is less than a preset interference threshold; and the first network and the second network are comprised in hybrid networks; and transmitting a correction signal at the transmit timeslot position by using the transmitter 102.

Optionally, an operation, performed by the processor 103, of calculating a transmit timeslot position that is in a GP used for transmitting a correction signal may specifically include:

calculating, based on a timeslot configuration of the first network and the timeslot configuration of the second network, a transmit timeslot position that is included in the GP and at which signal strength of the second network is less than preset signal strength when a correction signal is being transmitted in the GP.

Smaller signal strength, included in the transmit timeslot position, of the second network indicates that at the transmit timeslot position, transmission is less interfered by the signal transmitted by the second network. Specifically, the transmit timeslot position that is included in the GP and at which the signal strength of the second network is less than the preset signal strength may be pre-estimated when a correction signal is being transmitted in the GP. For example, a timeslot position that is in the GP and that differs from a timeslot position, in the second network, for transmitting a signal is calculated and is used as the foregoing transmit timeslot position.

Optionally, an operation, performed by the processor 103, of calculating, based on a timeslot configuration of the first network and the timeslot configuration of the second network, a transmit timeslot position that is included in the GP and at which signal strength of the second network is less than preset signal strength when a correction signal is being transmitted in the GP may specifically include:

calculating, based on the timeslot configuration of the first network and the timeslot configuration of the second network, a transmit timeslot position that is in the GP used for transmitting a correction signal and that differs from a timeslot position, in the second network, for transmitting a signal.

That is, the timeslot configuration of the first network and the timeslot configuration of the second network are acquired in advance, where the timeslot configuration of the first network may specifically include a timeslot configuration of the foregoing GP.

Optionally, an operation, performed by the processor 103, of calculating a transmit timeslot position that is in a GP used for transmitting a correction signal may specifically include:

calculating, by the processor 103, based on the signal transmitted by the second network, a transmit timeslot position that is included in the GP used for transmitting a correction signal and at which signal strength of the second network is less than preset signal strength.

Optionally, an operation, performed by the processor 103, of calculating, by the base station of the first network, based on the signal transmitted by the second network, a transmit timeslot position that is included in the GP used for transmitting a correction signal and at which signal strength of the second network is less than preset signal strength may specifically include:

calculating, based on the signal transmitted by the second network, power that the signal transmitted by the second network generates on each time-domain sampling point of the GP used for transmitting a correction signal; and     selecting, from the GP, a timeslot position that has a preset length and includes continuous interference time-domain sampling points whose quantity is less than a preset threshold as the transmit timeslot position, where the interference time-domain sampling point refers to a time-domain sampling point whose power is less than a preset interference power threshold.

Optionally, the time-domain sampling point may be set in advance, for example, setting 30 or 50 time-domain sampling points in the GP, and then power of each time-domain sampling point is calculated. Because in an actual application, a signal of the second network that leaks to the GP of the first network usually interferes with a timeslot, this timeslot may include one or more time-domain sampling points, so that this timeslot can be obtained through the foregoing power calculation. Correspondingly, the timeslot position that has the preset length and includes the continuous interference time-domain sampling points whose quantity is less than the preset threshold may be selected as the transmit timeslot position. The preset length may be specifically equal to or greater than a length of the correction signal.

The selecting, by the foregoing processor 103, from the GP, a timeslot position that has a preset length and includes continuous interference time-domain sampling points whose quantity is less than a preset threshold as the transmit timeslot position may further specifically include:

determining, by the processor 103, a time-domain sampling point that is included in the GP and whose power is less than the interference power threshold as a time-domain sampling point having no interference, and marking the time-domain sampling point having no interference with "1"; and determining a time-domain sampling point that is included in the GP and whose power is greater than or equal to the interference power threshold as a time-domain sampling point having interference, and marking the time-domain sampling point having interference with "0"; and     selecting, by the processor 103, from the GP, a timeslot position that has the preset length and includes continuous time-domain sampling points of "1" whose quantity is less than the preset threshold as the transmit timeslot position.

Optionally, after the calculating power of each time-domain sampling point, specific processing may be further performed on the power of each time-domain sampling point, for example, Alpha filtering.

Optionally, an operation, performed by the processor 103, of calculating, by the base station of the first network, based on the signal transmitted by the second network, a transmit timeslot position that is included in the GP used for transmitting a correction signal and at which signal strength of the second network is less than preset signal strength may specifically include:

calculating, based on the signal transmitted by the second network, energy that the signal transmitted by the second network generates on each correction symbol of the GP used for transmitting a correction signal, where a length of the correction symbol is equal to a length of the correction signal; and     selecting a correction symbol whose energy is the smallest among correction symbols included by the GP, and using the correction symbol as the transmit timeslot position.

Optionally, the selecting, by processor 103, a correction symbol whose energy is the smallest among correction symbols included by the GP, and using the correction symbol as the transmit timeslot position may specifically include:

selecting, by the processor 103, the correction symbol whose energy is the smallest among the correction symbols included by the GP, calculating interference power of each subcarrier in the correction symbol, selecting at least one subcarrier, whose interference power is less than a specific threshold, in subcarriers included in the correction symbol as a subcarrier that is used for transmitting a correction signal and is in the transmit timeslot position.

In another embodiment, the transmitter 102 may specifically include:

a remote radio unit (RRU), configured to transmit a correction signal at the transmit timeslot position.

In the foregoing technical solution, a transmit timeslot position that is in a guard period GP used for transmitting a correction signal is acquired, where the transmit timeslot position is a timeslot position that is determined based on a timeslot configuration of a second network and/or a signal transmitted by the second network, and interference suffered from a signal transmitted by the second network at the transmit timeslot position is less than a preset interference threshold; and the first network and the second network are comprised in hybrid networks; and the correction signal is transmitted at the transmit timeslot position. In this way, it can be implemented that a timeslot position for sending a correction signal is less interfered by a signal transmitted by a second network, so that interference to a correction signal in hybrid networking can be reduced.

A person of ordinary skill in the art may understand that all or some of the processes of the methods in the embodiments may be implemented by a computer program instructing related hardware. The program may be stored in a computer-readable storage medium. When the program runs, the processes of the methods in the embodiments are performed. The foregoing storage medium may include: a magnetic disk, an optical disc, a read-only memory (ROM), a random access memory (RAM), or the like.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an or relationship between the associated objects. In the foregoing embodiments, the description of each embodiment has respective focuses. For a part that is not described in detail in an embodiment, refer to related descriptions in other embodiments.

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A method, comprising:
acquiring, by a base station of a first network, a first transmit timeslot position in a guard period (GP) used for transmitting a correction signal, wherein the first transmit timeslot position is a timeslot position that is determined based on at least one of a timeslot configuration of a second network or a signal transmitted by the second network, wherein interference suffered from the signal transmitted by the second network in the first transmit timeslot position is less than a preset interference threshold; and
transmitting, by the base station of the first network, the correction signal in the first transmit timeslot position, wherein the first network and the second network are included in hybrid networks.

2. The method according to claim 1, wherein acquiring the first transmit timeslot position in the GP used for transmitting the correction signal comprises:
calculating, by the base station of the first network, based on a timeslot configuration of the first network and the timeslot configuration of the second network, the first transmit timeslot position in the GP where a signal strength of the second network is less than a preset signal strength when the correction signal is being transmitted in the GP.

3. The method according to claim 2, wherein calculating the first transmit timeslot position in the GP where the signal strength of the second network is less than the preset signal strength when the correction signal is being transmitted in the GP comprises:
calculating, by the base station of the first network, based on the timeslot configuration of the first network and the timeslot configuration of the second network, the first transmit timeslot position in the GP used for transmitting the correction signal and that is different from a second transmit timeslot position, in the second network.

4. The method according to claim 1, wherein acquiring the first transmit timeslot position in the GP used for transmitting the correction signal comprises:
calculating, by the base station of the first network, based on the signal transmitted by the second network, the first transmit timeslot position in the GP used for transmitting the correction signal where a signal strength of the second network is less than a preset signal strength.

5. The method according to claim 4, wherein calculating the first transmit timeslot position in the GP used for transmitting the correction signal where the signal strength of the second network is less than the preset signal strength comprises:
calculating, by the base station of the first network, based on the signal transmitted by the second network, a power that the signal transmitted by the second network generates on each time-domain sampling point of the GP used for transmitting the correction signal; and selecting, by the base station of the first network, from the GP, a timeslot position that has a preset length and comprises continuous interference time-domain sampling points whose number is less than a preset threshold as the first transmit timeslot position, wherein each interference time-domain sampling point refers to a time-domain sampling point whose power is less than a preset interference power threshold.

6. The method according to claim 4, wherein calculating the first transmit timeslot position in the GP used for transmitting the correction signal where the signal strength of the second network is less than the preset signal strength comprises:
calculating, by the base station of the first network, based on the signal transmitted by the second network, energy that the signal transmitted by the second network generates on a correction symbol of the GP used for transmitting the correction signal, wherein a length of the correction symbol is equal to a length of the correction signal; and
selecting, by the base station, the correction symbol whose energy is the smallest among correction symbols in the GP, and using the selected correction symbol in the first transmit timeslot position.

7. The method according to claim 1, wherein acquiring the first transmit timeslot position in the GP used for transmitting the correction signal comprises:
receiving, by the base station of the first network, indication information sent by a network-side device, wherein the indication information indicates the first transmit timeslot position that is in the GP used for transmitting the correction signal, and the first transmit timeslot position is a timeslot position that is determined by the network-side device based on a timeslot configuration of the first network and the timeslot configuration of the second network, where the interference of the signal transmitted by the second network is less than the preset interference threshold.

8. A base station of a first network, the base station comprising:
a processor configured to acquire a first transmit timeslot position in a guard period (GP) used for transmitting a correction signal, wherein the first transmit timeslot position is a timeslot position that is determined based on at least one of a timeslot configuration of a second network or a signal transmitted by the second network, and interference suffered from the signal transmitted by the second network in the first transmit timeslot position is less than a preset interference threshold; and
a transmitter configured to transmit the correction signal in the first transmit timeslot position, wherein the first network and the second network are included in hybrid networks.

9. The base station according to claim 8, wherein:
the transmitter is configured to calculate, based on a timeslot configuration of the first network and the timeslot configuration of the second network, the first transmit timeslot position in the GP where a signal strength of the second network is less than a preset signal strength when the correction signal is being transmitted in the GP.

10. The base station according to claim 9, wherein:
the processor is configured to calculate, based on the timeslot configuration of the first network and the timeslot configuration of the second network, the first transmit timeslot position in the GP used for transmitting the correction signal and that is different from a second transmit timeslot position, in the second network.

11. The base station according to claim 8, wherein:
the processor is configured to calculate, based on the signal transmitted by the second network, the first transmit timeslot position in the GP used for transmitting the correction signal where the signal strength of the second network is less than a preset signal strength.

12. The base station according to claim 11, wherein:
the processor is configured to:
calculate, based on the signal transmitted by the second network, a power that the signal transmitted by the second network generates on each time-domain sampling point of the GP used for transmitting the correction signal; and
select, from the GP, a timeslot position that has a preset length and comprises continuous interference time-domain sampling points whose number is less than a preset threshold as the first transmit timeslot position, wherein each interference time-domain sampling point refers to a time-domain sampling point whose power is less than a preset interference power threshold.

13. The base station according to claim 11, wherein:
the processor is configured to calculate, based on the signal transmitted by the second network, energy that the signal transmitted by the second network generates on a correction symbol of the GP used for transmitting the correction signal, wherein a length of the correction symbol is equal to a length of the correction signal; and
the processor is configured to select the correction symbol whose energy is the smallest among correction symbols in the GP, and use the correction symbol in the first transmit timeslot position.

14. The base station according to claim 8, wherein:
the processor is configured to receive indication information sent by a network-side device, wherein the indication information indicates the first transmit timeslot position that is in the GP used for transmitting the correction signal, and the first transmit timeslot position is a timeslot position that is determined by the network-side device based on a timeslot configuration of the first network and the timeslot configuration of the second network, where the interference of the signal transmitted by the second network is less than the preset interference threshold.

\* \* \* \* \*